United States Patent
Wang et al.

(10) Patent No.: US 12,430,149 B2
(45) Date of Patent: Sep. 30, 2025

(54) METHOD, APPARATUS, TERMINAL DEVICE AND MEDIUM FOR OBJECT PROCESSING

(71) Applicant: Beijing Zitiao Network Technology Co., Ltd., Beijing (CN)

(72) Inventors: Linbo Wang, Beijing (CN); Xinyu Wang, Beijing (CN); Di Gao, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/778,317

(22) Filed: Jul. 19, 2024

(65) Prior Publication Data

US 2024/0378065 A1     Nov. 14, 2024

Related U.S. Application Data (63) Continuation of application No. PCT/CN2023/070920, filed on Jan. 6, 2023.

(30) Foreign Application Priority Data

Jan. 21, 2022    (CN) .......................... 202210072170.5

(51) Int. Cl.
    *G06F 9/451*       (2018.01)
    *G06F 3/0484*      (2022.01)

(52) U.S. Cl.
    CPC ............ *G06F 9/451* (2018.02); *G06F 3/0484* (2013.01)

(58) Field of Classification Search
    CPC ................................ G06F 9/451; G06F 3/0484
    See application file for complete search history.

(56) References Cited

U.S. PATENT DOCUMENTS 11,494,782 B1 * 11/2022 Jacoby ................ G06Q 20/351
2005/0054419 A1    3/2005 Souza et al.
(Continued)

FOREIGN PATENT DOCUMENTS

CN       105489194 A    4/2016
CN       106896900 A    6/2017
(Continued)

OTHER PUBLICATIONS

9game.cn [online], "'Unbelievable maze' How to play the strategy of raising pigs for new year's goods," Jan. 2019, retrieved on Jul. 2024, retrieved from URL<https://www.9game.cn/news/2826822.html>, 4 pages (with English translation).
(Continued)

*Primary Examiner* — Andrey Belousov
(74) *Attorney, Agent, or Firm* — Fish & Richardson P.C.

(57) ABSTRACT

This disclosure provides a method, apparatus, terminal device and medium for object processing. The method of object processing includes: displaying a processing interface, a plurality of levels of processing attributes being displayed in the processing interface, the processing interface displaying a storage device corresponding to a current processing attribute that is currently activated; after the current processing attribute meets a preset condition, processing an object to be processed with the current processing attribute, and continuing to activate a next processing attribute as a current processing attribute; displaying a switched storage device after receiving a switching operation on a storage device displayed in the processing interface.

20 Claims, 4 Drawing Sheets

(56) References Cited

U.S. PATENT DOCUMENTS

| | | | |
|---|---|---|---|
| 2008/0270240 A1* | 10/2008 | Chu | G06Q 30/0239 |
| | | | 434/350 |
| 2012/0207208 A1 | 8/2012 | Wyatt et al. | |
| 2013/0205211 A1 | 8/2013 | Warren et al. | |
| 2015/0066382 A1 | 3/2015 | Von Allmen | |
| 2018/0036629 A1 | 2/2018 | Chen et al. | |
| 2018/0057808 A1 | 3/2018 | Goldberg et al. | |
| 2018/0330629 A1 | 11/2018 | Raman et al. | |
| 2020/0150828 A1 | 5/2020 | Kim et al. | |
| 2023/0025773 A1* | 1/2023 | Niemela | G06Q 30/0224 |

FOREIGN PATENT DOCUMENTS

| | | | |
|---|---|---|---|
| CN | 107231393 A | | 10/2017 |
| CN | 107402709 A | | 11/2017 |
| CN | 107506155 A | | 12/2017 |
| CN | 107766005 A | | 3/2018 |
| CN | 107797749 A | | 3/2018 |
| CN | 107807813 A | | 3/2018 |
| CN | 107995428 A | | 5/2018 |
| CN | 108334265 A | | 7/2018 |
| CN | 108510290 A | | 9/2018 |
| CN | 108920229 A | | 11/2018 |
| CN | 109034623 A | | 12/2018 |
| CN | 109614176 A | | 4/2019 |
| CN | 109783181 A | | 5/2019 |
| CN | 109806596 | | 5/2019 |
| CN | 109816199 A | | 5/2019 |
| CN | 110109746 A | | 8/2019 |
| CN | 110210191 A | | 9/2019 |
| CN | 110636212 A | | 12/2019 |
| CN | 110865716 A | | 3/2020 |
| CN | 110956628 A | | 4/2020 |
| CN | 110992056 A | | 4/2020 |
| CN | 111001158 A | | 4/2020 |
| CN | 111185014 A | | 5/2020 |
| CN | 111192191 A | | 5/2020 |
| CN | 111265870 A | | 6/2020 |
| CN | 111324207 A | | 6/2020 |
| CN | 111402026 A | | 7/2020 |
| CN | 111580730 A | | 8/2020 |
| CN | 111638820 A | | 9/2020 |
| CN | 111767585 A | | 10/2020 |
| CN | 111857919 A | | 10/2020 |
| CN | 111905377 A | | 11/2020 |
| CN | 112051961 A | | 12/2020 |
| CN | 112100606 A | | 12/2020 |
| CN | 112306365 A | | 2/2021 |
| CN | 112667331 A | | 4/2021 |
| CN | 112684949 A | | 4/2021 |
| CN | 112950294 A | | 6/2021 |
| CN | 113328828 A | | 8/2021 |
| CN | 113873281 A | * | 9/2021 ............ G06Q 20/06 |
| CN | 113559507 A | | 10/2021 |
| CN | 113613067 A | | 11/2021 |
| CN | 113797535 A | | 12/2021 |
| CN | 113873281 | | 12/2021 |
| CN | 114489897 | | 5/2022 |
| JP | 2000172912 A | | 6/2000 |
| JP | 2013223640 A | | 10/2013 |
| JP | 2015054005 | | 3/2015 |
| JP | 2019098153 A | | 6/2019 |
| JP | 2021045396 A | | 3/2021 |

OTHER PUBLICATIONS

Hishop.com.cn [online], "In 2020, how many meow coins will be raised to the next level? What are the awards for different grades?", Oct. 2020, retrieved on Jul. 2024, retrieved from URL<https://www.hishop.com.cn/ecschool/wztbnew/show_95224.html>, 4 pages (with English translation).

International Search Report and Written Opinion in International Appln. No. PCT/CN2023/070920, mailed on May 9, 2023, 6 pages (with English translation).

ITHome.com [online], "New features of Android 5.0: Clock background changes with time," Oct. 2014, retrieved on Jul. 2024, retrieved from URL<https://www.ithome.com/0/108/400.htm>, 2 pages (with English translation).

Woshipm.com [online], "Dry goods summary: dynamic icon design rule for product homepage," Feb. 2021, retrieved on Jul. 2024, retrieved from URL<https://www.woshipm.com/pd/4377372.html>, 14 pages (with English translation).

Notification to Grant Patent in Chinese Appln. No. 202210072170.5, dated Jul. 11, 2023, 10 pages (with English translation).

Extended European Search Report in European Appln No. 23742719.0, dated Feb. 24, 2025, 11 pages.

Office Action in Japanese Appln. No. 2024-543267, dated Jun. 24, 2025, 10 pages (with English translation).

* cited by examiner

METHOD, APPARATUS, TERMINAL DEVICE AND MEDIUM FOR OBJECT PROCESSING

CROSS REFERENCE

This application claims priority to and is a continuation of International Patent Application No. PCT/CN2023/070920, filed on Jan. 6, 2023, which claims priority to Chinese Patent Application No. 202210072170.5 filed with the Chinese Patent Office on Jan. 21, 2022, the entirety of both and together are incorporated herein by reference.

FIELD

The present disclosure relates to the field of computer technology, for example, to a method, apparatus, terminal device and medium for object processing.

BACKGROUND

An application refers to a computer program that performs one or more specific tasks, runs in user mode, can interact with users, and has a visual User Interface.

With the development of technology, various types of applications have emerged, and different types of applications have different objects to be processed. When objects are processed in the application, processing methods lack diversity, such as only processing those objects with set attributes, which reduces the user experience when processing to-be-processed objects. Thereby, the probability of successful processing of objects to be processed is reduced, and further the utilization rate of the application is affected.

SUMMARY

The present disclosure provides an object processing method, apparatus, terminal device and medium to enrich the interaction with the user during object processing, thereby improving the user experience and the success rate of the object processing activities.

In a first aspect, the present disclosure provides an object processing method, applied to an application, the method comprising:
  displaying a processing interface, a plurality of levels of processing attributes being displayed in the processing interface, each level of processing attribute corresponding to a storage device, the corresponding storage device being used for storing virtual identifiers, the plurality of levels of processing attributes being activated in sequence starting from the lowest level of processing attribute that is currently not activated, the processing interface displaying a storage device corresponding to a current processing attribute that is currently activated;
  after the current processing attribute meets a preset condition, processing an object to be processed with the current processing attribute, and continuing to activate a next processing attribute as a current processing attribute, an attribute value of the next processing attribute being greater than an attribute value of the current processing attribute;
  displaying a switched storage device after receiving a switching operation on a storage device displayed in the processing interface.

In a second aspect, the present disclosure further provides an object processing apparatus, the apparatus comprising:
  a first display module, configured for displaying a processing interface, a plurality of levels of processing attributes being displayed in the processing interface, each level of processing attribute corresponding to a storage device, the corresponding storage device being used for storing virtual identifiers, the plurality of levels of processing attributes being activated in sequence starting from the lowest level of processing attribute that is currently not activated, the processing interface displaying a storage device corresponding to a current processing attribute that is currently activated;
  a processing module, configured for, after the current processing attribute meets a preset condition, processing an object to be processed with the current processing attribute, and continuing to activate a next processing attribute as a current processing attribute, an attribute value of the next processing attribute being greater than an attribute value of the current processing attribute;
  a second display module, configured for displaying a switched storage device after receiving a switching operation on a storage device displayed in the processing interface.

In a third aspect, the present disclosure further provides a terminal device, the terminal device comprising:
  one or more processors;
  a memory, configured for storing one or more programs;
  the one or more programs, when executed by the one or more processors, causing the one or more processors to perform the object processing method provided in the present disclosure.

In a fourth aspect, the present disclosure further provides a computer-readable medium, on which a computer program is stored, the program, when executed by a processor, performing the object processing method provided by the present disclosure.

In a fifth aspect, the present disclosure further provides a computer program product, comprising a computer program carried on a non-transient computer-readable medium, the computer program containing program codes for performing the object processing method provided by the present disclosure.

DETAILED DESCRIPTION

The following embodiments of the present disclosure will be described with reference to the accompanying drawings. Although some embodiments of the present disclosure are shown in the drawings, the present disclosure can be implemented in various forms, and these embodiments are provided to understand the present disclosure. The drawings and embodiments of the present disclosure are for illustrative purposes only.

Various steps described in method implementations of the present disclosure may be performed in a different order and/or in parallel. In addition, the method implementations may comprise an additional step and/or omit a step which is shown. The scope of the present disclosure is not limited in this regard.

The term "comprise" and its variants used here are to be read as open terms that mean "include, but is not limited to". The term "based on" is to be read as "based at least in part on". The term "one embodiment" are to be read as "at least one embodiment". The term "another embodiment" is to be read as "at least one other embodiment". The term "some embodiments" are to be read as "at least some embodiments". Other definitions will be presented in the description below.

The concepts "first", "second" and so on mentioned in the present disclosure are only for differentiating different apparatuses, modules or units rather than limiting the order or mutual dependency of functions performed by these apparatuses, modules or units.

The modifications "one" and "a plurality" mentioned in the present disclosure are illustrative rather than limiting, and those skilled in the art should understand that unless otherwise specified, they should be understood as "one or more".

Names of messages or information interacted between a plurality of means in the implementations of the present disclosure are merely for the illustration purpose, rather than limiting the scope of these messages or information.

In the following embodiments, each of the embodiments provides both optional features and examples. Multiple features described in the embodiments may be combined to form multiple optional solutions, and each numbered embodiment should not be considered as only one technical solution.

First Embodiment

Figure 1:
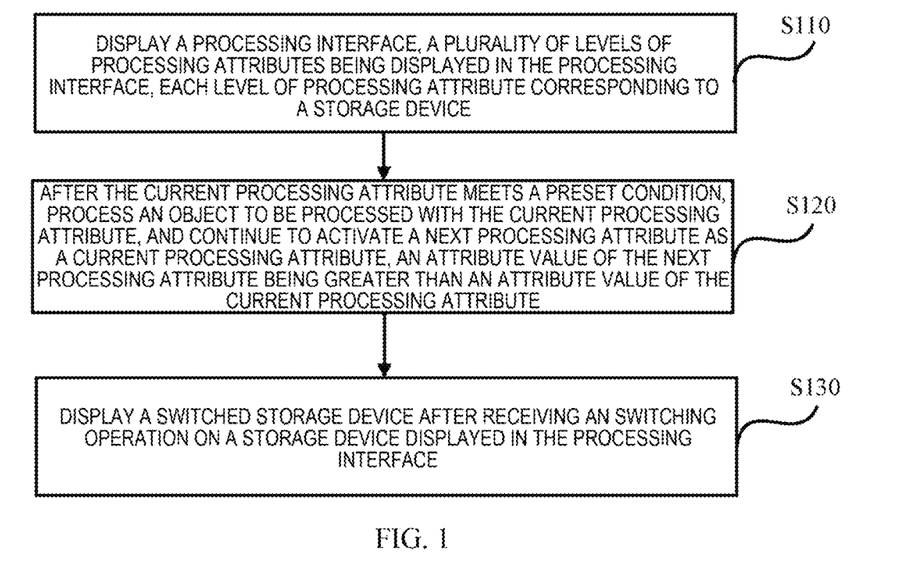
FIG. 1 is a schematic flowchart of an object processing method according to a first embodiment of the present disclosure.

FIG. 1 is a schematic flowchart of an object processing method provided by a first embodiment of the present disclosure. The method may be applied to process a to-be-processed object and may be performed by an object processing apparatus, wherein the apparatus may be implemented as software and/or hardware and generally integrated on a terminal device. In this embodiment, the terminal device includes but is not limited to: a computer, a laptop, a smart phone, a tablet and other devices.

As shown in FIG. 1, an object processing method provided by a first embodiment of the present disclosure, applied to an application, comprises the following:

S110: displaying a processing interface, where a plurality of levels of processing attributes are displayed in the processing interface, each level of processing attributes corresponding to a storage device.

In this embodiment, the object to be processed may be considered an object to be processed within the application, different applications correspond to different objects to be processed, and the present disclosure is not intended to limit the object to be processed. As an example, the object to be processed may be a virtual resource, for example, may be a red envelope, may be some content in the application that should be paid for, such as shooting effects, video shooting duration, etc., which is not limited here. In the following embodiments, illustrative description is presented by taking a virtual resource as an example of the object to be processed.

The processing interface can refer to an interface that processes the object to be processed, such as an activity interface where the user receives rewards by doing tasks. A plurality of levels of processing attributes can be displayed in the processing interface.

The processing attribute can refer to an abstract characterization of the nature of the object to be processed. For example, if the object to be processed is a virtual resource, the quantity can abstract the magnitude of the virtual resource to a certain extent. The processing attribute can be understood as a certain number of virtual resources; the attribute value can be understood as the size of the quantity value corresponding to the virtual resource. Based thereon, the processing attributes of a plurality of levels can be understood as a plurality of virtual resources with different quantity values, and a virtual resource with a quantity value is a level. In addition, the processing style corresponding to each level can be set to the same or different.

Each level of processing attributes can correspond to a storage device, and the corresponding storage device can be used to store virtual identifiers. The virtual identifier can be understood as a virtual object used to identify the object to be processed, such as a virtual coin, a virtual bean, etc., which can be used to represent the number of virtual identifiers obtained by quantity. Storage devices can refer to devices used to store virtual identifiers. For example, the storage device can be set in the form of a piggy bank and also can be set as a transparent piggy bank (which can display virtual identifiers stored therein). On this basis, storage devices can also be designed to add any animal morphological elements, such as the zodiac morphological elements corresponding to the current year, which are not limited here. For example, the state of the storage device may be set to the shape of a little tiger to match the zodiac corresponding to the year used by the application. The storage devices corresponding to the processing attributes of each level can be designed to be the same or different.

In an embodiment, each storage device may further be provided to include three states, namely a locked state (i.e., which may be understood as the storage device not being activated), an empty bank state (i.e., which may be understood as the storage device being activated but not storing any virtual identifier) and a virtual identifier storage state (i.e., which may be understood as the storage device having stored the corresponding virtual identifier). For example, for the storage device in a locked state, if the storage device is in the form of a piggy bank, the bank body may be provided with a lock marker to characterize that the storage device is in a locked state; on this basis, the storage device in an empty bank state can be set as a piggy bank from which the lock marker is removed, the storage device in a virtual identifier storage state may be set as a piggy bank from which the lock marker is removed and which contains the corresponding virtual identifier.

In the processing process of processing attributes at each level, the virtual identifiers in the corresponding storage device can dynamically change with the processing progress of the processing attributes. For example, as the number of virtual identifiers obtained by the user increases, the processing progress of the processing attribute will also increase. At this time, the virtual identifiers in the corresponding storage device can also change with the processing progress. If the processing progress of the processing attribute is half completed, the corresponding storage device can also be displayed as storing half of the virtual identifiers to visually provide users with a dynamic sense of interaction.

A plurality of levels of processing attributes can be activated in sequence, and activation can be understood as triggering the processing start process of the processing attribute. For example, starting from the processing attribute with the lowest level that is not currently activated, the processing attributes can be activated in sequence, that is, after processing the object to be processed based on the currently activated processing attribute, the processing attribute of the next level of the processing attribute can be activated, and so on, until the processing object to be processed is processed based on all processing attributes is processed. On this basis, the storage device corresponding to a processing attribute that is currently activated can be displayed in the processing interface. The current processing attribute can be understood as a processing attribute that is currently activated but has not been processed.

Different objects to be processed can correspond to different processing policies. Taking a virtual resource as an example of the object to be processed, the processing of virtual resources can be considered as transferring virtual resources. The processing of processing attributes can be considered as accumulating virtual identifiers corresponding to processing attributes. When the accumulated virtual identifiers reach a certain level, it can be considered that the processing attributes meet the preset conditions. Therefore, the process of causing processing attributes to meet the preset conditions can be considered as processing attributes.

For example, assuming that there are 5 levels of processing attributes displayed in the processing interface, the attribute values corresponding to each level of processing attributes can be different. Each level of processing attributes can correspond to a piggy bank (i.e., storage device) for storing virtual coins (i.e., virtual identifiers). A plurality of levels of processing attributes can be sequentially activated starting from the processing attribute with the lowest level that is currently not activated, and the processing interface can also display the piggy bank corresponding to the currently activated processing attribute.

S120: after the current processing attribute meets the preset conditions, processing an object to be processed with the current processing attribute, and continuing to activate the next processing attribute as a current processing attribute, where the attribute value of the next processing attribute is greater than the attribute value of the current processing attribute.

In this embodiment, the preset condition may be understood as a condition which is preset and which may characterize the completion of the processing of the current processing attribute. For example, the preset condition may be determined based on the number of stored virtual identifiers corresponding to the current processing attribute. That is, if the number of virtual identifiers stored in a current storage device corresponding to the current processing attribute meets the set storage quantity, it can be considered that the current processing attribute satisfies the preset condition.

The attribute values of different processing attributes can be different, that is, the attribute value of the next processing attribute can be greater than the attribute value of the current processing attribute. Therefore, the setting of the number of virtual identifiers in the preset conditions corresponding to different processing attributes can be different. For example, as the processing attribute level increases from low to high, the setting of the number of virtual identifiers can be sequentially increased.

After a current processing attribute satisfies the preset condition, the object to be processed can be processed with the current processing attribute and the next processing attribute can continue to be activated as a current processing attribute. The processing of the object to be processed with the current processing attribute can be understood as, based on the attribute value corresponding to the completed current processing attribute, transferring the object to be processed corresponding to the attribute value to the user. For example, if the object to be processed is a virtual resource and the attribute value corresponding to the current processing attribute is quantity A, then the object to be processed is processed with the current processing attribute, i.e., the virtual resource of the size of quantity A is transferred to the user side (such as the user's local account side).

S130: after receiving a switching operation on a storage device displayed in the processing interface, displaying the switched storage device.

In this embodiment, the switching operation may refer to an operation of the user switching a storage device displayed in the processing interface, for example, the user switches a storage device displayed in the processing interface by touching the screen and swiping left and right. After receiving the switching operation on the storage device displayed in the processing interface, the switched storage device can be displayed; if the user swipes the displayed storage device to the left, a storage device corresponding to the next level of processing attribute can be displayed, and if the user swipes the displayed storage device to the right, a storage device corresponding to the previous level of processing attribute can be displayed.

If displayed in the current processing interface is a storage device corresponding to the highest level of processing attribute, the storage device displayed when the user swipes to the left can still be the storage device currently displayed, or returns to the storage device corresponding to the lowest level of processing attribute. Similarly, if displayed in the current processing interface is a storage device corresponding to the lowest level of processing attribute, the storage device displayed when the user swipes to the right can still be the storage device currently displayed, or it can cycle to a storage device corresponding to the highest level of processing attribute.

In an object processing method provided by a first embodiment of the present invention, first a processing interface is displayed, a plurality of levels of processing attributes being displayed in the processing interface, each level of processing attributes corresponding to a storage device, the corresponding storage device used for storing a virtual identifier. The plurality of levels of processing attributes are activated in sequence starting from the lowest level of processing attribute that is not currently activated, the processing interface displaying a storage device corresponding to a current processing attribute that is currently activated. After the current processing attribute satisfies a preset condition, the object to be processed is processed with the current processing attribute, and the next processing attribute continues to be activated as ta current processing attribute, the attribute value of the next processing attribute being greater than the attribute value of the current processing attribute. After receiving a switching operation on the storage device displayed in the processing interface, the switched storage device is displayed. In the method, by setting the attribute value of the next processing attribute to be greater than the attribute value of the current processing attribute, and activating the plurality of levels of processing attributes in sequence starting from the lowest level of processing attribute that is not currently activated, the user can process objects to be processed based on the plurality of processing attributes with different attribute values, improving the probability of successful processing of objects to be processed and the utilization rate of the application; further, by setting each level of processing attribute to correspond to a storage device that stores virtual identifiers, the page richness of the object processing activity can be improved; on this basis, the switched storage device can also be displayed in the processing interface according to the user's switching operation, enriching the interactive operation with the user and thereby improving the user experience.

Second Embodiment

Figure 2:
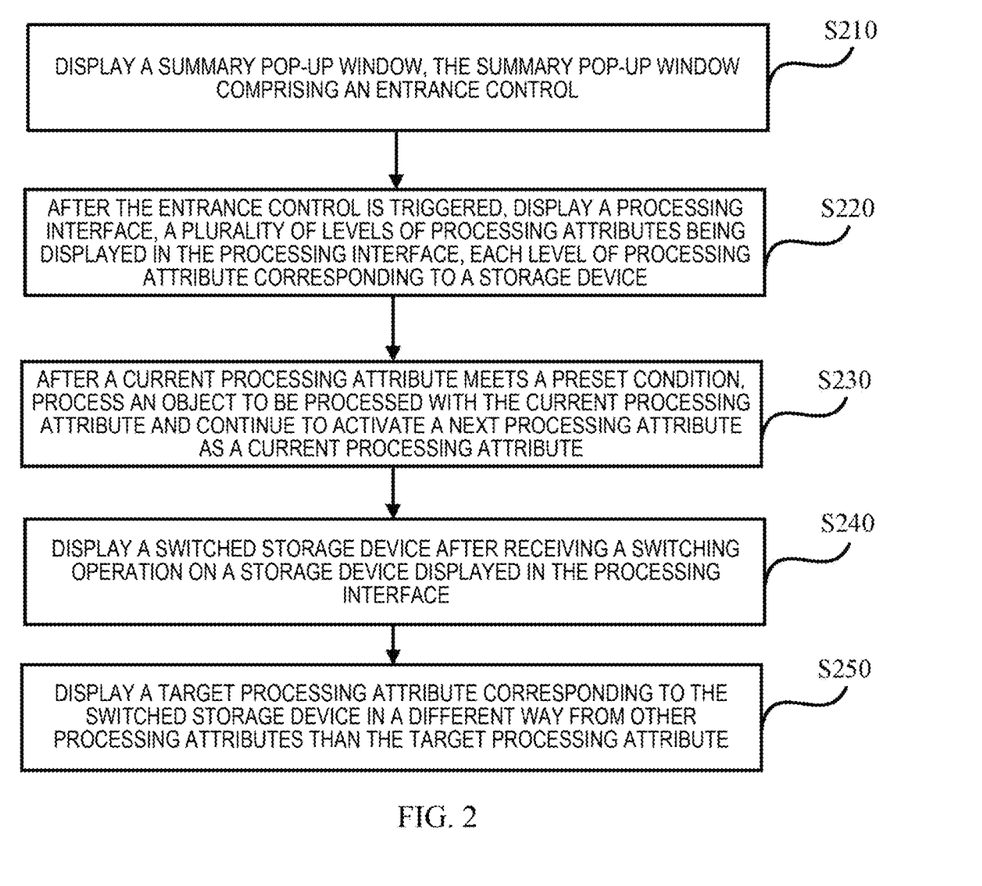
FIG. 2 is a schematic flowchart of an object processing method according to a second embodiment of the present disclosure.

FIG. 2 is a schematic flowchart of an object processing method provided by a second embodiment of the present disclosure, the second embodiment being illustrated based on the solution in the above-described embodiment. For content that is not detailed in this embodiment, reference may be made to the first embodiment.

As shown in FIG. 2, the second embodiment of the present disclosure provides an object processing method, the method comprising:

S210: displaying an entrance pop-up window, the entrance pop-up window containing an entrance control.

S220: after the entrance control is triggered, displaying a processing interface, a plurality of levels of processing attributes being displayed in the processing interface, each level of processing attribute corresponding to a storage device.

In this embodiment, the entrance pop-up window may refer to a pop-up window containing an entrance control, and may further include indication information, which may indicate the number of virtual identifiers obtained after entering the processing interface through the entrance pop-up window. The style of the entrance pop-up window is not limited here, for example, the entrance pop-up window may be displayed in the form of a lucky bag.

The trigger timing of the entrance pop-up window is not limited, which can be randomly issued at the server level or can be triggered after the user completes a set goal.

The set goal can refer to a preset task goal, such as opening the application for the first time every day, opening the application and browsing the interface for more than a set time (such as 10 seconds), etc. After the user completes the set goal, the entrance pop-up window can be displayed. The entrance control can refer to a control for entering the processing interface, such as a button provided in the entrance pop-up window. After the entrance control in the entrance pop-up window is triggered (such as when the user clicks on the entrance control in the entrance pop-up window), the processing interface can be jumped to display.

For example, taking the Spring Festival activities as an example, the entrance pop-up window can be set to be displayed in the form of a lucky bag, which can contain the content of "Brand X gives you a Spring Festival lucky bag+500 gold coins" (i.e. indication information); it can also include a "Accept Now" button (i.e. entrance control). After the user clicks on the "Accept Now" button, the corresponding processing interface can be displayed.

A plurality of levels of processing attributes can be displayed in the processing interface. Each level of processing attribute corresponds to a storage device, and the corresponding storage device can be used to store virtual identifiers. The plurality of levels of processing attributes can be activated in sequence starting from the processing attribute of the lowest level that is currently not activated, and the storage device corresponding to a current processing attribute that is currently activated can be displayed in the processing interface.

Displaying the processing interface comprises: obtaining time information when the processing interface is displayed in the application; displaying the corresponding processing interface with an effect corresponding to the time information.

In this embodiment, different time information can be displayed corresponding to different processing interfaces. Time information can be obtained when the processing interface is displayed in the application. The time information can refer to information that characterizes time. Here, the expression form of the time information is not limited. For example, the time information can be the day, month and year, hour, minute and second, and can also be the year, month, day, hour, minute and second. On this basis, when the processing interface is displayed in this embodiment, the display effect of the processing interface can be affected by the time information. For example, processing interfaces in different colors can be displayed according to different time information. When the time information is characterized as daytime, the processing interface can be displayed in red. When the time information is characterized as nighttime, the processing interface can be displayed in blue-violet. For another example, when the time information corresponds to a festival, corresponding festival elements can also be displayed in the processing interface. If the date corresponding to the time information is the Spring Festival, fireworks and other Spring Festival elements can be displayed in the processing interface. Festival elements can be understood as elements related to festivals, and the content is not limited.

The time dimension included in the time information is not limited to day and night. A day can also be divided into a plurality of time periods, and different styles or colors of processing interfaces are displayed in different time periods. The time information can also include spring, summer, autumn and winter, and the styles of processing interfaces for different seasons are different. The style is not limited to colors.

The time information when the processing interface is displayed in the application can be obtained by obtaining the system time (for example, the system time can be xx year, xx month, xx day, xx hour, xx minute) of an electronic device running the application as the time information through corresponding technical means (which is not limited here), and the way of obtaining the time information when the processing interface is displayed in the application is not limited here. For example, the displaying the processing interface comprises: obtaining weather information when the processing interface is displayed in the application; displaying the processing interface, weather elements corresponding to the weather information being displayed in the processing interface.

In this embodiment, weather information when the processing interface is displayed in the application can be obtained, and the weather information may refer to information characterizing weather conditions corresponding to a current time, such as rain, snow and other weather information. On this basis, the processing interface is displayed, and weather elements corresponding to the weather information may be displayed in the processing interface. For example, when the weather information is rainy or snowy, elements such as rain dropping or snow falling may be displayed in the processing interface. The rain element and snow element belong to the weather elements.

This embodiment can obtain local location information in the application (the local location information is authorized by the user through the application), for example, the local location information can be Beijing, Tianjin and other cities. The local location information can characterize the location information of a city where the user is located, and the city where the user is located can be determined based on the location information. On this basis, the weather information of the corresponding city can be determined according to the obtained local location information.

This embodiment displays the corresponding processing interface according to the setting of the time information and weather information, which can enhance the layering of the processing interface, deepen the user's interest in exploring activities and improve the retention rate.

The buttons displayed in the processing interface are provided with corresponding animation effects based on achieved functions.

In this embodiment, the processing interface may be provided to display corresponding activity buttons, such as "Function Description", "Record", "Share", "Shake" and other buttons, and may be provided with corresponding animation effects based on achieved functions. For example, the "Function Description" button can be added with dynamic effects of coin jumping, and the "Shake" button can be added with dynamic effects such as wrist shaking, which is not limited herein.

The number of virtual identifiers in the storage device corresponding to the current processing attribute increases with the increase of the number of obtained virtual identifiers; after the identification element corresponding to the current processing attribute executes a corresponding animation after a set event is triggered; the set event includes one or more of the following: an event of virtual identifier obtaining, an event of the current processing attribute satisfying the preset condition, and an event of activating the next processing attribute.

In this embodiment, the number of virtual identifiers in the storage device corresponding to the current processing attribute increases with the increase of the number of obtained virtual identifiers. Assuming that the virtual identifier is a virtual coin and the storage device is a piggy bank, the number of virtual coins stored in the piggy bank corresponding to the current processing attribute can increase with the increase of the number of obtained virtual coins, so as to increase the visual layering for the user. On this basis, the real texture of the piggy bank and virtual coins can be enhanced through three-dimensional rendering, and the sound effect of depositing virtual coins in the bank can be used to deepen the user's satisfaction with obtaining virtual coins, and the sophistication of the processing interface can also be improved to a certain extent.

The identification element corresponding to the current processing attribute can execute a corresponding animation after a set event is triggered. The set event can include one or more of the following: an event of virtual identifier obtaining, an event of the current processing attribute satisfying the preset condition, and an event of activating the next processing attribute.

As an example, taking a little tiger wearing different clothing as an example of the identification element, in the processing interface, when a virtual identifier is stored in the storage device corresponding to the current processing attribute (i.e., an event of virtual identifier obtaining), the corresponding animation of the little tiger's fist-palm salute can be triggered, or when the storage device corresponding to the current processing attribute is filled with virtual identifiers (i.e., an event of the current processing attribute satisfying the preset condition), the corresponding animation of the little tiger spinning and jumping can be triggered, or after completing the current processing attribute and activating the next processing attribute (i.e., an event of activating the next processing attribute), the animation of the little tiger waving goodbye can be triggered, etc. On this basis, while triggering the little tiger operation animation, prompt information of the progress of the current processing attribute can be conveyed to the user with a sound and/or a pop-up bubble above the little tiger's head. For example, the prompt information can be that "50.2% of the bank is full, the object to be processed can be processed with the current processing attribute when the bank is full", etc. This embodiment can improve the interactivity by setting the interactive animation of the little tiger (i.e., the identification element).

S230: after the current processing attribute satisfies the preset condition, processing the object to be processed with the current processing attribute and continuing to activate the next processing attribute as a current processing attribute.

In this embodiment, the attribute values of different processing attributes may be different, for example, the attribute value of the next processing attribute may be greater than that of the current processing attribute S240: after receiving a switching operation on the storage device displayed in the processing interface, displaying the switched storage device.

S250: displaying a target processing attribute corresponding to the switched storage device in a way different from other processing attributes than the target processing attribute.

In this embodiment, the switched storage device may refer to a storage device that is currently displayed in the processing interface in response to the switching operation. The target processing attribute may refer to a processing attribute corresponding to the storage device that is currently displayed in the processing interface in response to the switching operation. Displaying in a different way may be considered as that the target processing attribute is displayed in a way or style different from other processing attributes than the target processing attribute. For example, compared with other processing attributes than the target processing attribute, the target processing attribute is displayed in the processing interface with a set magnification ratio.

As an example, in the processing interface, when the user independently swipes to switch the displayed piggy bank (i.e., storage device), whichever piggy bank is switched to, the target processing attribute corresponding to the piggy bank can be displayed accordingly with a set magnification ratio, i.e., is displayed in a way different from other processing attributes than the target processing attribute. In this embodiment, by setting the different display mode, the user can see the piggy bank corresponding to each processing attribute, and is clearly aware of the concept that processing attributes with higher attribute values can be obtained by filling the last piggy bank. Therefore, the user's animation incentive feedback after filling the piggy bank is strengthened, so as to improve the probability of the user processing objects to be processed.

Different processing attributes correspond to different identification elements, which are determined based on the zodiac corresponding to the year when the user uses the application.

In this embodiment, the identification element can be determined based on the zodiac corresponding to the year when the user uses the application. For example, if the year belongs to the Year of Tiger (i.e., the corresponding zodiac is a tiger), the identification element can be determined based on the tiger element. Different processing attributes can correspond to different identification elements. For example, different tiger images of different breeds can be designed as different identification elements based on the tiger element, or different clothing containing tiger elements can be designed as different identification elements based on the same tiger image. This is not limited here.

Different identification elements are provided with different element clothing.

In this embodiment, the element clothing may refer to clothing with a zodiac element corresponding to the year when the processing interface is displayed in the application. If the year when the user uses the application is the Year of Tiger, the element clothing may be clothes, hats, shoes and so on with tiger elements. Different identification elements may be provided with different element clothing. For example, different element clothing may be set as different identification elements based on the same little tiger image. For example, assuming there are five processing attributes, five identification elements may be accordingly set, and the five identification elements may be little tigers based on the same little tiger image and provided with different element clothing (such as different clothes, hats, and shoes). Further, there may be different corresponding identification element names, such as tiger of good luck, tiger of health, tiger of fortune, tiger of peace and tiger of reunion.

In this embodiment, different processing attributes correspond to different identification elements, which, in turn, may be provided with different element clothing. Thereby, it is possible for the user to clearly perceive the association between the processing attributes and the identification elements. The element clothing may also combine traditional clothing and modern clothing to form unique element clothing of new Chinese style.

A summary pop-up window is displayed, the summary pop-up window including a view control. After the view control is triggered, a summary interface is displayed, the summary interface displaying summary information of the user processing objects to be processed within a set time.

In this embodiment, the summary pop-up window may refer to a pop-up window containing a view control, and the summary pop-up window may further include information on the total number of virtual identifiers accumulated by the user within a set time. The view control may refer to a control for triggering the display of a summary page. After the summary pop-up window is displayed, the user can display the summary interface by clicking on the view control in the summary pop-up window (that is, the view control is triggered), and the summary interface may display summary information of the processing of objects to be processed by the user within a set time. The summary information of the processing of objects to be processed can be understood as the cumulative information of the virtual identifiers obtained during processing objects to be processed. For example, the summary information of the processing of objects to be processed can be information such as "Use Application A to obtain 500 gold coins", "Download Application B to obtain 1000 gold coins", etc. The style of the summary pop-up window is not limited here. For example, the summary pop-up window can be displayed in the form of a daily pop-up window, and the user can click on a "View" button (i.e., view control) in the daily pop-up window to display the corresponding summary interface.

Figure 3:
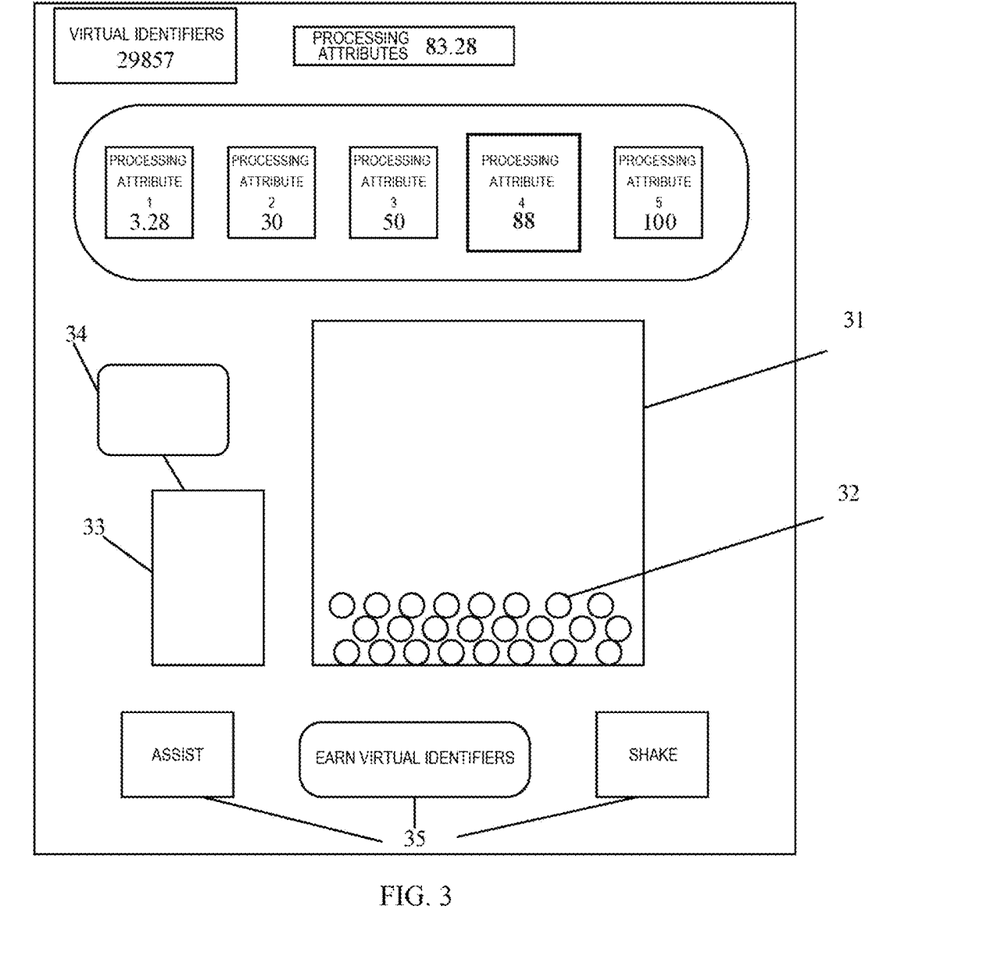
FIG. 3 is a schematic diagram of a processing interface according to the second embodiment of the present disclosure.

FIG. 3 is a schematic diagram of a processing interface provided by the second embodiment of the present invention. As shown in FIG. 3, the part "virtual identifier 29857" can represent the number of virtual identifiers in the current storage device; the part "processing attribute 83.28" can represent the attribute value of the processing attribute corresponding to the object to be processed accumulated up to now. "Processing attribute 4" occupies a larger area than other processing attributes, indicating that "processing attribute 4" is displayed differently from other processing attributes, that is, "processing attribute 4" is the target processing attribute. A storage device 31 is the storage device 31 corresponding to "processing attribute 4", and the storage device 31 contains a currently accumulated virtual identifier 32. A corresponding identification element 33 is provided on one side of the storage device 31. After the set event is triggered, the identification element 33 can trigger the corresponding animation effect. At the same time, a pop-up window 34 containing prompt information and/or a voice broadcast prompt information content triggering the identification element 33 can also be displayed above the identification element 33. By clicking on corresponding buttons 35 which are displayed in the processing interface, such as "Share", "Earn Virtual Identifiers" and "Shake", the user can enter the corresponding activity page, and the buttons 35 can also be provided with corresponding animation effects based on achieved functions.

The second embodiment provides an object processing method. By setting the entrance pop-up window and the entrance control, the method can enrich the interaction pattern for the user to enter the processing interface and improve the participation rate of the user in the object processing activity; on this basis, by setting the corresponding processing interface according to the time information and weather information and by setting different processing attributes to correspond to different identification elements after entering the processing interface, the method can improve the picture richness and layering of the processing interface from a visual perspective, enrich the interaction between the user and the interface through the interactive animation of the identification element, and deepen the user's interest and experience of the interface activity. In addition, by displaying the target processing attribute corresponding to the storage device of the corresponding switching operation in a different way from other processing attributes than the target processing attribute, the user is clearly aware of the attribute value of each level of processing attribute through the switching operation and is motivated to obtain a higher attribute value, thereby improving the user's interest and experience of the object processing activity.

Third Embodiment

Figure 4:
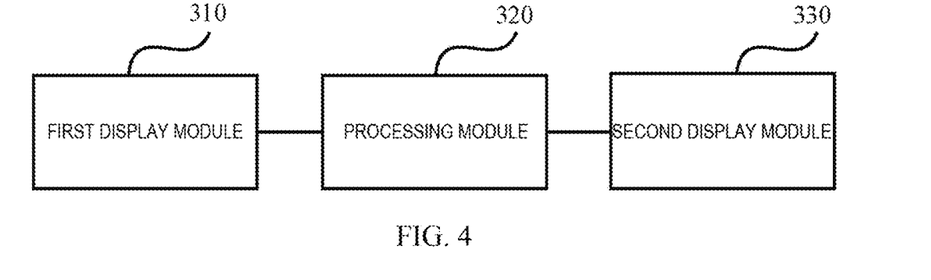
FIG. 4 is a schematic structural diagram of an object processing apparatus according to a third embodiment of the present disclosure.

FIG. 4 is a schematic structural diagram of an object processing apparatus provided by a third embodiment of the present disclosure, which may be implemented as software and/or hardware and generally integrated on a terminal device.

As shown in FIG. 4, the apparatus comprises: a first display module 310, a processing module 320, and a second display module 330;

The first display module 310 is configured for displaying a processing interface, and a plurality of levels of processing attributes are displayed in the processing interface. Each level of processing attribute corresponds to a storage device, and the corresponding storage device is used for storing virtual identifiers. The plurality of levels of processing attributes are activated in sequence starting from the lowest level of processing attribute that is currently not activated. The processing interface displays a storage device corresponding to a current processing attribute that is currently activated. The processing module 320 is configured for, after the current processing attribute meets a preset condition, processing an object to be processed with the current processing attribute, and continuing to activate a next processing attribute as a current processing attribute. An attribute value of the next processing attribute is greater than an attribute value of the current processing attribute. The second display module 330 is configured for displaying a switched storage device after receiving a switching operation on a storage device displayed in the processing interface.

In this embodiment, first, the apparatus, through the first display module 310, displays the processing interface, the processing interface displaying a plurality of levels of processing attributes, each level of processing attributes corresponding to a storage device, the corresponding storage device being used for storing virtual identifiers, the plurality of levels of processing attributes being activated in sequence starting from the lowest level of processing attribute that is not currently activated, the processing interface displaying a storage device corresponding to a current processing attribute that is currently activated; then through the processing module 320, after the current processing attribute meets a preset condition, processes an object to be processed with the current processing attribute, and continues to activate a next processing attribute as a current processing attribute, an attribute value of the next processing attribute being greater than an attribute value of the current processing attribute; finally through the second display module 330, after receiving a switching operation on a storage device displayed in the processing interface, displays the switched storage device. The apparatus sets the attribute value of the next processing attribute to be greater than the attribute value of the current processing attribute, and activates the plurality of levels of processing attributes in sequence starting from the lowest level of processing attribute that is not currently activated. Thereby, the user can process objects to be processed based on a plurality of processing attributes with different attribute values, improving the probability of successful processing of objects to be processed and the utilization rate of the application; and by setting each level of processing attribute to correspond to a storage device which stores virtual identifiers, the page richness of the object processing activity can be improved; on this basis, the switched storage device can also be displayed in the processing interface according to the user's switching operation, enriching the interactive operation with the user and improving the user's experience.

In an embodiment, the apparatus further comprises:
a differential display module, configured for displaying a target processing attribute corresponding to the switched storage device in a different way from other processing attributes than the target processing attribute.

In an embodiment, different processing attributes correspond to different identification elements.

In an embodiment, the number of virtual identifiers in a storage device corresponding to the current processing attribute increases as the number of obtained virtual identifiers increases; an identification element corresponding to the current processing attribute performs corresponding animation after a set event is triggered; the set event includes one or more of the following:

An event of virtual identifier obtaining, an event of the current processing attribute meeting a preset condition, and an event of activating a next processing attribute.

In an embodiment, the apparatus further comprises:
a summary pop-up window display module, configured for displaying a summary pop-up window, the summary pop-up window including a view control; a summary interface display module, configured for displaying a summary interface after the view control is triggered, the summary interface displaying summary information of a user processing the object to be processed within a set time.

In an embodiment, the first display module 310 further comprises:
a time information obtaining unit, configured for obtaining time information when the processing interface is displayed in the application; and an interface display unit, configured for displaying a processing interface corresponding to an effect corresponding to the time information.

In an embodiment, a button displayed in the processing interface is provided with a corresponding animation effect based on an achieved function.

The object processing apparatus can perform the object processing method provided in any embodiment of the present disclosure, with the corresponding functional modules and effects of the execution method.

Fourth Embodiment

Figure 5:
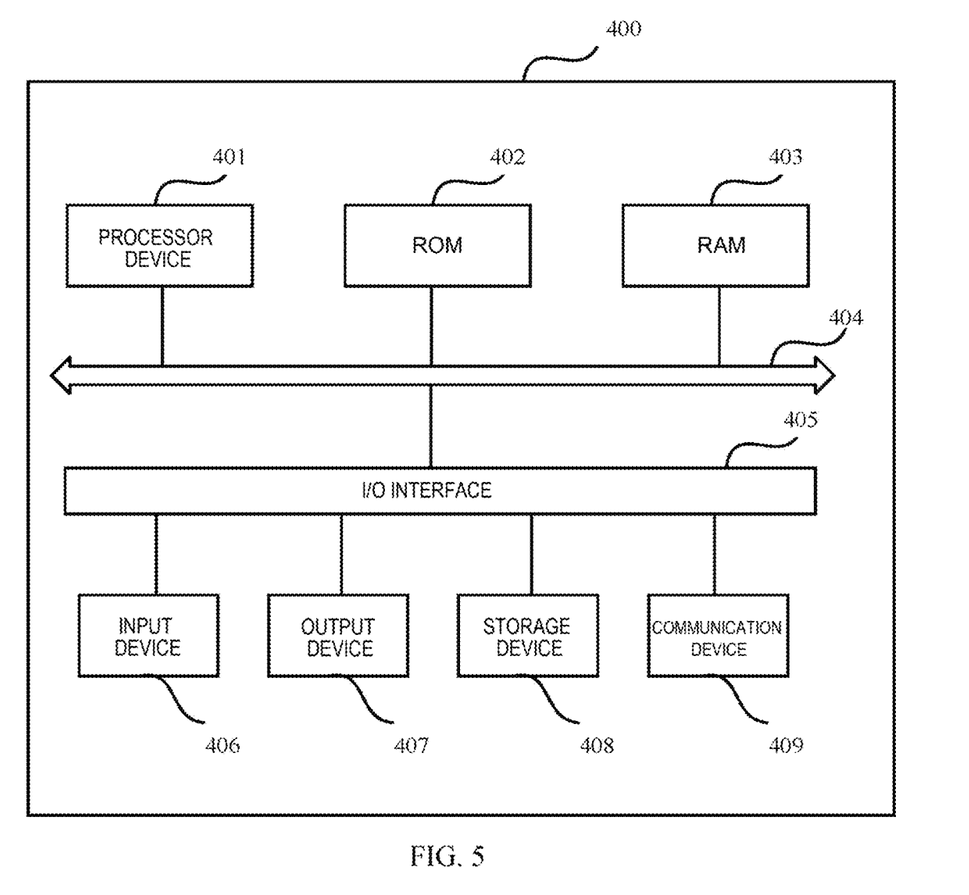
FIG. 5 is a schematic structural diagram of a terminal device according to a fourth embodiment of the present disclosure.

FIG. 5 is a schematic structural diagram of a terminal device according to a fourth embodiment of the present disclosure. FIG. 5 shows a schematic structural diagram of a terminal device 400 suitable for implementing the present disclosure. The terminal device 400 in the embodiments of the present disclosure may include, but is not limited to, mobile terminals such as a mobile phone, a notebook computer, a digital broadcast receiver, a personal digital assistant (PDA), a PAD (tablet computer), a portable media player (PMP) and a vehicle-mounted terminal (for example, a vehicle-mounted navigation terminal), and fixed terminals such as a digital television (TV) and a desktop computer. The electronic device shown in FIG. 5 is merely an example, and should not impose any limitation to the function or the scope of application of the embodiments of the present disclosure.

As shown in FIG. 5, the terminal device 400 may include a processor (such as a central processing unit and a graphics processor) 401, which may execute various appropriate actions and processing according to a program stored in a read-only memory (ROM) 402 or a program loaded to a random access memory (RAM) 403 from a storage device 408. Various programs and data required during operation of the electronic device 400 are also stored in the RAM 403. The processor 401, the ROM 402 and the RAM 403 are connected with one another via a bus 404. An input/output (I/O) interface 405 is also connected to the bus 404.

Generally, the following apparatuses may be connected to the I/O interface 405: an input device 406 including for example a touch screen, a touch pad, a keyboard, a mouse, a camera, a microphone, an accelerometer and a gyroscope; an output device 407 including for example a liquid crystal display (LCD), a speaker and a vibrator; a storage device 408 including for example a magnetic tape and a hard disk;

and a communication device 409. The communication device 409 may allow wireless or wired communication between the terminal device 400 and other devices for data exchange. Although FIG. 5 shows the terminal device 400 having various devices, it should be understood that not all the devices shown are necessarily required to be implemented or provided. More or fewer devices may alternatively be implemented or provided.

According to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flowcharts. In such an embodiment, the computer program may be downloaded and installed from the network via the communication device 409, or installed from the storage device 408, or installed from the ROM 402. The computer program, when executed by the processor 401, causes the processing unit to execute the above functions defined in the methods according to the embodiments of the present disclosure.

The computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

In some implementation methods, clients and servers can communicate using any currently known or future developed network protocol such as Hyper Text Transfer Protocol (HTTP), and can interconnect with any form or medium of digital data communication (such as communication networks). Examples of communication networks include local area networks (LANs), wide area networks (WANs), the Internet (such as the Internet), and end-to-end networks (such as ad hoc end-to-end networks), as well as any currently known or future developed networks.

The computer-readable medium may be included in the terminal device 400; may be present alone, without fitting into the terminal device 400.

The above-mentioned computer-readable medium stores one or more computer programs, and when the above-mentioned one or more programs are executed by a processor, the following methods are implemented: displaying a processing interface, wherein a plurality of levels of processing attributes are displayed in the processing interface, each level of processing attribute corresponds to a storage device, the corresponding storage device is used for storing virtual identifiers, the plurality of levels of processing attributes are activated in sequence starting from the lowest level of processing attribute that is currently not activated, and the processing interface displays a storage device corresponding to a current processing attribute that is currently activated; after the current processing attribute meets a preset condition, processing an object to be processed with the current processing attribute, and continuing to activate a next processing attribute as a current processing attribute, an attribute value of the next processing attribute being greater than an attribute value of the current processing attribute; displaying a switched storage device after receiving a switching operation on a storage device displayed in the processing interface. The computer-readable medium carrying one or more programs, when the one or more programs are executed by the terminal device, so that the terminal device 400: may be in one or more programming languages or combinations thereof to write computer program code for performing the operations of the present disclosure, the programming languages include Object Oriented programming languages, such as Java, Smalltalk, C++, further comprising conventional procedural programming languages, such as "C" language or similar programming language. The program code may be executed entirely on the user's computer, partially executed on the user's computer, executed as a separate software package, partially executed on the user's computer on a remote computer, or entirely on a remote computer or server. In the case involving a remote computer, the remote computer may be connected to the user's computer via any kind of network, including a LAN or WAN, or may be connected to an external computer (e.g., using an Internet service provider to connect via the Internet).

The flowcharts and block diagrams in the accompanying drawings illustrate the architecture, functions, and operations of systems, methods, and computer program products that may be implemented in accordance with various embodiments of the present disclosure. each block in the flowcharts or block diagrams may represent a module, program segment, or portion of code that contains one or more executable instructions for implementing a specified logical function. It should also be noted that in some alternative implementations, the functions indicated in the blocks may also occur in a different order than those indicated in the figures. For example, two blocks represented in succession may actually be executed substantially in parallel, and they may sometimes be executed in reverse order, depending on the functions involved. It should also be noted that each block in the block diagrams and/or flowcharts, and combinations of blocks in the block diagrams and/or flowcharts, may be implemented using a dedicated hardware-based system that performs the specified functions or operations, or may be implemented using a combination of dedicated hardware and computer instructions.

Described in the present embodiment relates to the disclosed module may be implemented by way of software, may be implemented by way of hardware. Wherein the name of the module in one case does not constitute a limitation on the module itself.

The functions described above in this article can be performed at least in part by one or more hardware logic components. For example, without limitation, exemplary types of hardware logic components that can be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. Examples of machine-readable storage media may include electrical connections based on one or more wires, portable computer disks, hard disks, RAM, ROM, EPROM or flash memory, optical fibers, CD-ROMs, optical storage devices, magnetic storage devices, or any suitable combination thereof.

According to one or more embodiments of the present disclosure, Example 1 provides a method of object processing comprising:
- displaying a processing interface, wherein a plurality of levels of processing attributes are displayed in the processing interface, each level of processing attribute corresponds to a storage device, the corresponding storage device is used for storing virtual identifiers, the plurality of levels of processing attributes are activated in sequence starting from the lowest level of processing attribute that is currently not activated, and the processing interface displays a storage device corresponding to a current processing attribute that is currently activated; after the current processing attribute meets a preset condition, processing an object to be processed with the current processing attribute, and continuing to activate a next processing attribute as a current processing attribute, an attribute value of the next processing attribute being greater than an attribute value of the current processing attribute;
- displaying a switched storage device after receiving a switching operation on a storage device displayed in the processing interface.

According to one or more embodiments of the present disclosure, Example 2 according to the method of Example 1, further comprising:
- displaying a target processing attribute corresponding to the switched storage device in a different way from other processing attributes than the target processing attribute.

According to one or more embodiments of the present disclosure, Example 3 according to the method of Example 1,
- different processing attributes correspond to different identification elements.

According to one or more embodiments of the present disclosure, Example 4 according to the method of Example 1,
- the number of virtual identifiers in a storage device corresponding to the current processing attribute increases as the number of obtained virtual identifiers increases;
- an identification element corresponding to the current processing attribute performs corresponding animation after a set event is triggered;
- the set event comprises one or more of:
- an event of virtual identifier obtaining, an event of the current processing attribute meeting a preset condition, and an event of activating a next processing attribute.

According to one or more embodiments of the present disclosure, Example 5 according to the method of Example 1,
- displaying a summary pop-up window, wherein the summary pop-up window comprises a view control;
- displaying a summary interface after the view control is triggered, wherein the summary interface displays summary information of a user processing the object to be processed within a set time.

According to one or more embodiments of the present disclosure, Example 6 according to the method of Example 1,
- obtaining time information when the processing interface is displayed in the application; and
- displaying a processing interface corresponding to an effect corresponding to the time information.

According to one or more embodiments of the present disclosure, Example 7 according to the method of Example 1,
- a button displayed in the processing interface is provided with a corresponding animation effect based on an achieved function.

According to one or more embodiments of the present disclosure, Example 8 provides an apparatus for object processing comprising:
- a first display module, configured for displaying a processing interface, wherein a plurality of levels of processing attributes are displayed in the processing interface, each level of processing attribute corresponds to a storage device, the corresponding storage device is used for storing virtual identifiers, the plurality of levels of processing attributes are activated in sequence starting from the lowest level of processing attribute that is currently not activated, and the processing interface displays a storage device corresponding to a current processing attribute that is currently activated;
- a processing module, configured for, after the current processing attribute meets a preset condition, processing an object to be processed with the current processing attribute, and continuing to activate a next processing attribute as a current processing attribute, an attribute value of the next processing attribute being greater than an attribute value of the current processing attribute;
- a second display module, configured for displaying a switched storage device after receiving a switching operation on a storage device displayed in the processing interface.

According to one or more embodiments of the present disclosure, Example 9 provides an terminal device comprising:

one or more processors;
a memory, configured for storing at least one program;
the at least one program, when executed by the at least one processor, causing the at least one processor to perform an object processing a method according to any of Examples 1-7.

According to one or more embodiments of the present disclosure, Example 10 provides a computer-readable medium having stored thereon a computer program, the program is executed by a processor to implement a method according to any of Examples 1-7.

In addition, although multiple operations are depicted in a specific order, this should not be understood as requiring these operations to be performed in the specific order shown or in sequential order. Under certain circumstances, multi-tasking and parallel processing may be advantageous. Similarly, although multiple implementation details are included in the above discussion, these should not be construed as limiting the scope of the present disclosure. Some features described in the context of individual embodiments can also be implemented in combination in a single embodiment. Conversely, multiple features described in the context of a single embodiment can also be implemented in multiple embodiments separately or in any suitable subcombination.

The invention claimed is:

1. A method of object processing, applied to an application, the method comprising:
   displaying a processing interface, wherein a plurality of levels of processing attributes are displayed in the processing interface, each level of processing attribute corresponds to a storage device, the corresponding storage device is used for storing virtual identifiers and associated with a state selected from multiple states comprising a locked state, an empty bank state, and a virtual identifier storage state, each of the multiple states is associated with a corresponding visual representation of the storage device, the plurality of levels of processing attributes are activated in sequence starting from the lowest level of processing attribute that is currently not activated, and the processing interface displays a storage device corresponding to a current processing attribute that is currently activated;
   after the current processing attribute meets a preset condition, processing an object to be processed with the current processing attribute, and continuing to activate a next processing attribute as a current processing attribute and change the state of the storage device corresponding to the next processing attribute from the locked state to the empty bank state, an attribute value of the next processing attribute being greater than an attribute value of the current processing attribute, wherein in the processing process of processing attributes at each level, the virtual identifier stored in the storage device corresponding to the processing attribute of a current level dynamically changes with a processing progress of the current processing attributes;
   displaying a switched storage device after receiving a switching operation on a storage device displayed in the processing interface, the switched storage device is different from the storage device displayed in the processing interface.

2. The method of claim 1, further comprising:
   displaying a target processing attribute corresponding to the switched storage device in a different way from other processing attributes than the target processing attribute.

3. The method of claim 1, wherein,
   different processing attributes correspond to different identification elements.

4. The method of claim 1, wherein,
   the number of virtual identifiers in a storage device of the current level corresponding to the current processing attribute increases as the number of obtained virtual identifiers increases of the current level;
   an identification element corresponding to the current processing attribute performs corresponding animation after a set event is triggered;
   the set event comprises one or more of:
   an event of virtual identifier obtaining, an event of the current processing attribute meeting a preset condition, and an event of activating a next processing attribute.

5. The method of claim 1, further comprising:
   displaying a summary pop-up window, wherein the summary pop-up window comprises a view control;
   displaying a summary interface after the view control is triggered, wherein the summary interface displays summary information of a user processing the object to be processed within a set time.

6. The method of claim 1, wherein the displaying a processing interface comprises:
   obtaining time information when the processing interface is displayed in the application; and
   displaying a processing interface corresponding to an effect corresponding to the time information.

7. The method of claim 1, wherein, a button displayed in the processing interface is provided with a corresponding animation effect based on an achieved function.

8. A terminal device comprising:
   at least one processor;
   a memory, configured for storing at least one program;
   the at least one program, when executed by the at least one processor, causing the at least one processor to perform acts of object processing, applied to an application, the acts comprising:
   displaying a processing interface, wherein a plurality of levels of processing attributes are displayed in the processing interface, each level of processing attribute corresponds to a storage device, the corresponding storage device is used for storing virtual identifiers and associated with a state selected from multiple states comprising a locked state, an empty bank state, and a virtual identifier storage state, each of the multiple states is associated with a corresponding visual representation of the storage device, the plurality of levels of processing attributes are activated in sequence starting from the lowest level of processing attribute that is currently not activated, and the processing interface displays a storage device corresponding to a current processing attribute that is currently activated;
   after the current processing attribute meets a preset condition, processing an object to be processed with the current processing attribute, and continuing to activate a next processing attribute as a current processing attribute and change the state of the storage device corresponding to the next processing attribute from the locked state to the empty bank state, an attribute value of the next processing attribute being greater than an attribute value of the current processing attribute, wherein in the processing process of processing attributes at each level, the virtual identifier stored in the storage device corresponding to the processing attribute of a current level dynamically changes with a processing progress of the current processing attributes;

displaying a switched storage device after receiving a switching operation on a storage device displayed in the processing interface, the switched storage device is different from the storage device displayed in the processing interface.

9. The device of claim 8, the acts further comprising:
displaying a target processing attribute corresponding to the switched storage device in a different way from other processing attributes than the target processing attribute.

10. The device of claim 8, wherein,
different processing attributes correspond to different identification elements.

11. The device of claim 8, wherein,
the number of virtual identifiers in a storage device of the current level corresponding to the current processing attribute increases as the number of obtained virtual identifiers increases of the current level;
an identification element corresponding to the current processing attribute performs corresponding animation after a set event is triggered;
the set event comprises one or more of:
an event of virtual identifier obtaining, an event of the current processing attribute meeting a preset condition, and an event of activating a next processing attribute.

12. The device of claim 8, the acts further comprising:
displaying a summary pop-up window, wherein the summary pop-up window comprises a view control;
displaying a summary interface after the view control is triggered, wherein the summary interface displays summary information of a user processing the object to be processed within a set time.

13. The device of claim 8, wherein the displaying a processing interface comprises:
obtaining time information when the processing interface is displayed in the application; and
displaying a processing interface corresponding to an effect corresponding to the time information.

14. The device of claim 8, wherein,
a button displayed in the processing interface is provided with a corresponding animation effect based on an achieved function.

15. A non-transitory computer-readable medium having stored thereon a computer program, the computer program is executed by a processor to implement acts of object processing, applied to an application, the acts comprising:
displaying a processing interface, wherein a plurality of levels of processing attributes are displayed in the processing interface, each level of processing attribute corresponds to a storage device, the corresponding storage device is used for storing virtual identifiers and associated with a state selected from multiple states comprising a locked state, an empty bank state, and a virtual identifier storage state, each of the multiple states is associated with a corresponding visual representation of the storage device, the plurality of levels of processing attributes are activated in sequence starting from the lowest level of processing attribute that is currently not activated, and the processing interface displays a storage device corresponding to a current processing attribute that is currently activated;

after the current processing attribute meets a preset condition, processing an object to be processed with the current processing attribute, and continuing to activate a next processing attribute as a current processing attribute and change the state of the storage device corresponding to the next processing attribute from the locked state to the empty bank state, an attribute value of the next processing attribute being greater than an attribute value of the current processing attribute, wherein in the processing process of processing attributes at each level, the virtual identifier stored in the storage device corresponding to the processing attribute of a current level dynamically changes with a processing progress of the current processing attributes;

displaying a switched storage device after receiving a switching operation on a storage device displayed in the processing interface.

16. The medium of claim 15, the acts further comprising:
displaying a target processing attribute corresponding to the switched storage device in a different way from other processing attributes than the target processing attribute, the switched storage device is different from the storage device displayed in the processing interface.

17. The medium of claim 15, wherein,
different processing attributes correspond to different identification elements.

18. The medium of claim 15, wherein,
the number of virtual identifiers in a storage device of the current level corresponding to the current processing attribute increases as the number of obtained virtual identifiers increases of the current level;
an identification element corresponding to the current processing attribute performs corresponding animation after a set event is triggered;
the set event comprises one or more of:
an event of virtual identifier obtaining, an event of the current processing attribute meeting a preset condition, and an event of activating a next processing attribute.

19. The medium of claim 15, the acts further comprising:
displaying a summary pop-up window, wherein the summary pop-up window comprises a view control;
displaying a summary interface after the view control is triggered, wherein the summary interface displays summary information of a user processing the object to be processed within a set time.

20. The medium of claim 15, wherein the displaying a processing interface comprises:
obtaining time information when the processing interface is displayed in the application; and
displaying a processing interface corresponding to an effect corresponding to the time information.

* * * * *